United States Patent [19]

Szabo

[11] 4,016,315
[45] Apr. 5, 1977

[54] SHEATHED SOFT-HANDLE WITH CONCEALED LAPPED ENDS

[75] Inventor: Marton J. Szabo, Westmont, N.J.

[73] Assignee: P.H.C. Industries, Inc., Camden, N.J.

[22] Filed: Dec. 17, 1975

[21] Appl. No.: 641,614

[52] U.S. Cl. ............................ 428/68; 16/116 R; 156/273; 428/71; 428/315; 428/542
[51] Int. Cl.² ...................................... B32B 5/18
[58] Field of Search ............ 16/110 R, 116 R, 125; 190/57; 428/68, 71, 542, 315; 156/273

[56] References Cited

UNITED STATES PATENTS

| 3,090,048 | 5/1963 | Loew | 2/338 |
|---|---|---|---|
| 3,530,031 | 9/1970 | Loew | 428/127 |
| 3,736,621 | 6/1973 | Szabo | 16/116 |
| 3,758,360 | 9/1973 | Szabo | 156/273 |
| 3,892,615 | 7/1975 | Szabo | 156/273 |
| 3,952,383 | 4/1976 | Moore et al. | 190/57 X |

Primary Examiner—George F. Lesmes
Assistant Examiner—Henry F. Epstein
Attorney, Agent, or Firm—Max R. Millman

[57] ABSTRACT

A soft-feel handgrip for a handle construction having cushioning members for the top and bottom of the grip and a thermoplastic sheath wrapped around each member with concealed overlapped sheath ends and a method of making the handgrip employing dielectrical sealing. The invention also encompasses a handgrip in which the sheaths for the top and bottom of the handgrip may be different, i.e. one can be a porous non-thermoplastic sheath while the other can be a thermoplastic sheath, yet the instant method will effectively seal the disparate members dielectrically and at the same time conceal the sealed overlapped ends of the sheaths thereby enhancing the esthetic appeal of the handle.

15 Claims, 8 Drawing Figures

U.S. Patent  April 5, 1977  Sheet 2 of 2  4,016,315
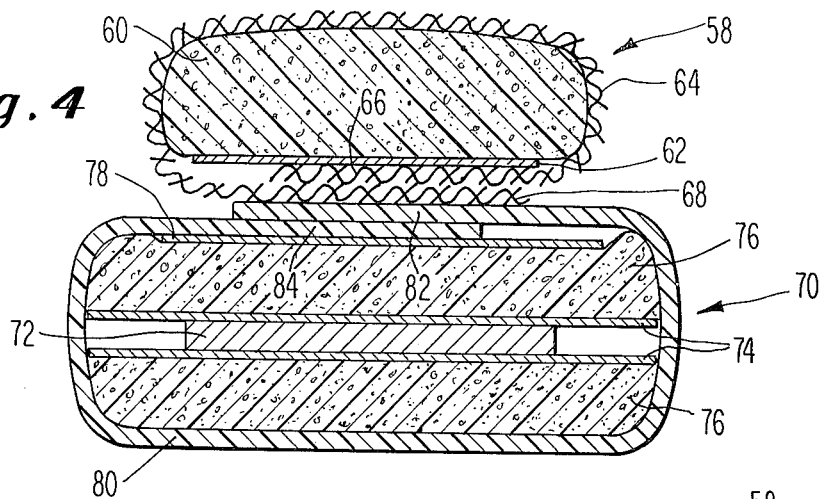
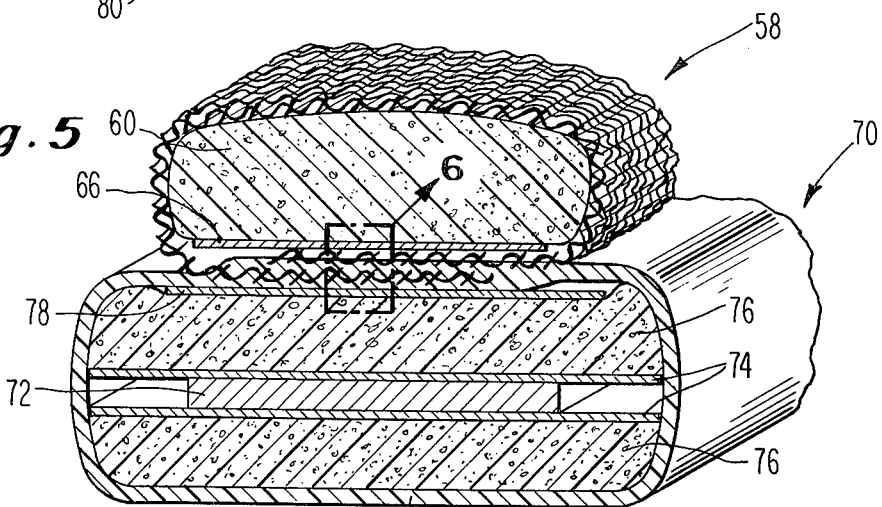
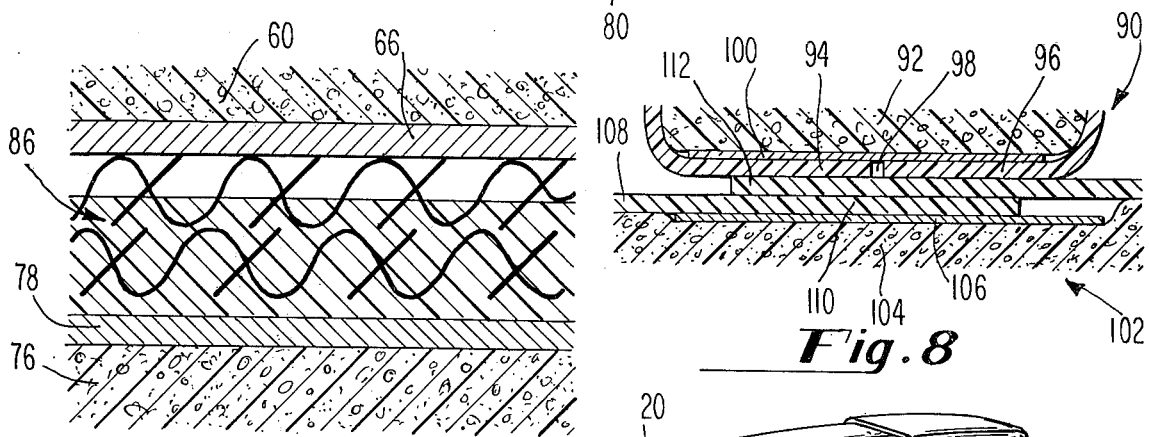
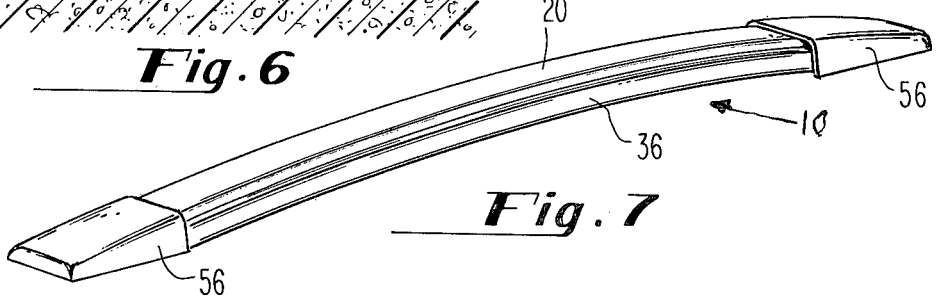

SHEATHED SOFT-HANDLE WITH CONCEALED LAPPED ENDS

This invention relates to a sheathed cushioned handle for radios, television sets, electronic instruments, luggage, carrying cases and the like.

Cushioned handles employing thermoplastic sheaths with lap seams sealed dielectrically are disclosed in my U.S. Pat. Nos. 3,736,621; 3,758,360; and 3,892,615. In those patents I disclose a construction in which the lap ends of the sheaths are effectively sealed dielectrically but the lapped ends where sealed are, nevertheless, somewhat exposed, and generally at the underside of the handgrip.

It is the primary object of this invention to provide a sheathed cushioned handle and method of making the same which constitute improvements over the handles and methods disclosed in the aforesaid patents and in which the dielectrically sealed lapped ends of the sheaths are concealed.

Another object of the invention is to provide a sheathed cushioned handle whose handgrip includes discrete portions with separate sheaths around each portion and including lapped ends, the lapped ends of the sheaths abutting each other, the lapped ends of each sheath being sealed to each other and to the lapped ends of the sheath of the abutting portion to thereby provide a strong unitary attractive handgrip with concealed sealed lapped sheath ends.

Another object of the invention is to provide a sheathed cushioned handgrip of the character described and method of making the same in which the sheath around one discrete portion is made of thermoplastic material and hence is dielectrically sealable and the sheath around the other discrete portion is porous and of non-thermoplastic material, such as cotton, wool, polyester cloth, etc., and in which the lapped ends of the thermoplastic sheath are sealed dielectrically in such a manner that the thermoplastic material of that sheath melts and enters some or all the pores of the non-thermoplastic sheath to form a strong bond and, hence, a unitary attractive handgrip with concealed sealed lapped sheath ends.

Another object of the invention is to provide a sheathed handgrip including two discrete portions each with a core and sheath surrounding the core, one sheath having overlapped end portions and the other having non-overlapped end portions, the overlapped end portions of the one sheath being sealed to each other and to the non-overlapped end portions of the other sheath to provide a unitary handgrip in which the overlapped end portions of the one sheath are concealed.

Another object of the invention is to provide a sheathed cushioned handgrip of the character described and a method of making the same in which the discrete sheathed portions are coextensive but may vary in thickness and width to thereby produce a handgrip with concealed sealed lapped sheath ends of varying esthetic appeal.

These and other objects of the invention will become more apparent as the following description proceeds in conjunction with the accompanying drawings, wherein:

FIG. 4 is a sectional view similar to FIG. 2 of a modified form of handle assembled prior to sealing;

FIG. 5 is a fragmentary perspective view partially in cross-section of the handle of FIG. 4 after sealing with the machine of FIG. 1;

FIG. 6 is a fragmentary enlarged section of the handle of FIG. 5 showing the sealing junction;

FIG. 7 is a perspective view of a completed handle made in accordance with the instant invention; and FIG. 8 is a fragmentary sectional view similar to FIG. 2 of yet another modified form of the invention.

Specific reference is now made to the drawings in which similar reference characters are used for corresponding elements throughout.

Figure 1:
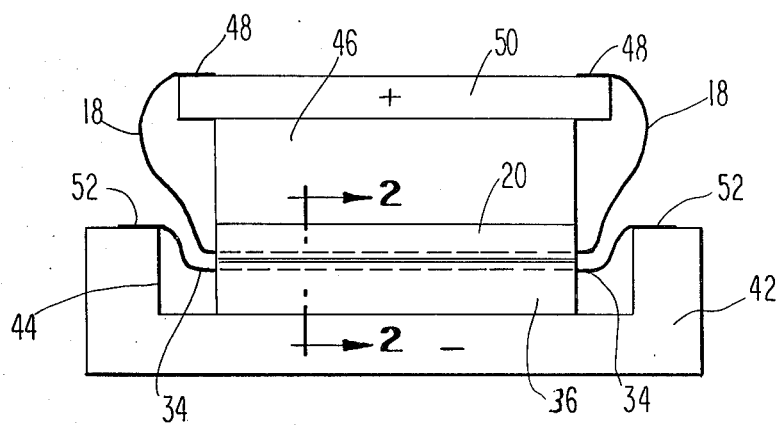
FIG. 1 is a diagrammatic view of a conventional dielectric sealing machine with the handle of the instant invention in place prior to the sealing operation.

Considering first the handle construction shown in FIGS. 1–3 and 7, the grip portion 10 thereof comprises two discrete portions, an upper one 12 and a lower one 14 which are coextensive but may be the same or different in width and/or thickness and/or material.

The upper portion includes a core comprised of a cushioning member 16 made of any suitable flexibly resilient material, such as foam polyurethane, polystyrene, polyester and rubber, and an electrically conductive member 18 at the bottom of the cushioning member.

The member 18 can take several forms. It can be a strip of metal foil, such as aluminum, copper and the like, from about 0.001 inch to 0.003 inch thick. It can be a strip of plastic, such as polyvinyl chloride, with a metal coating on one surface thereof, the other surface being secured by an adhesive such as rubber cement to the lower surface of the cushioning member 16. It can be a plastic strip, such as cellulose acetate, having pressure sensitive adhesive on opposite faces with metallic foil secured on one face so that the other face can be adhered to the lower cushioning strip 16. It can be an electrically conductive adhesive strip.

The electrically conductive member 18 must not be so thin as to create too much resistance to the flow of current therethrough, and if it is to remain in the final handgrip structure, it should be sufficiently resiliently flexible to follow the shape of the handgrip 10 and should be malleable so that the feel of hardness in the handgrip is minimized. If one desires to remove the conductive member 18 after sealing as described in U.S. Pat. No. 3,892,615, the conductive member can be a smooth-sided metal bar, although the use of a flexibly resilient conductive member is preferred.

A sheath or cover 20 generally about one thirty-second inch thick surrounds the core of cushioning member 16 and conductive member 18 and may be made of any suitable thermoplastic resin such as polyvinyl chloride, polystyrene, polycarbonate, polyurethane, the acrylics, etc., in single ply or two ply such as vinyl bonded to a vegetable fiber.

Figure 2:
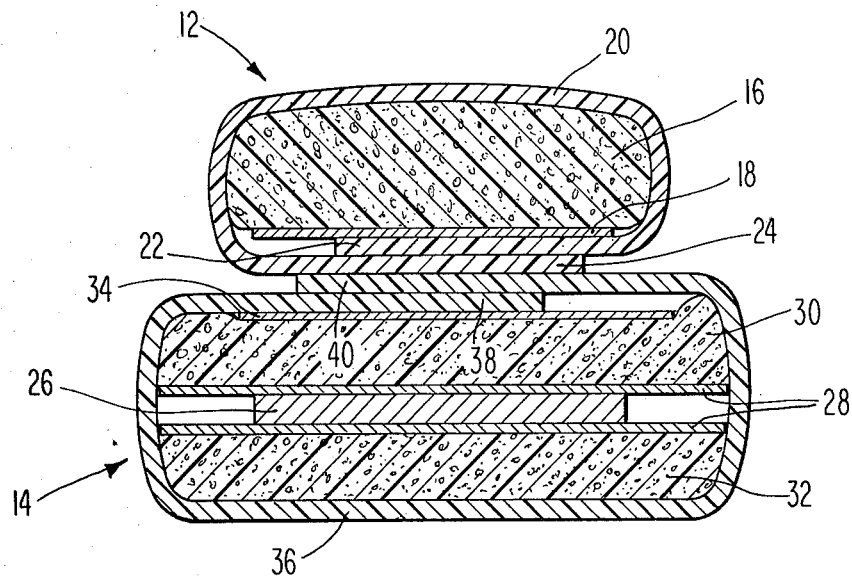
FIG. 2 is a sectional view taken on the line 2—2 of FIG. 1.
Figure 3:
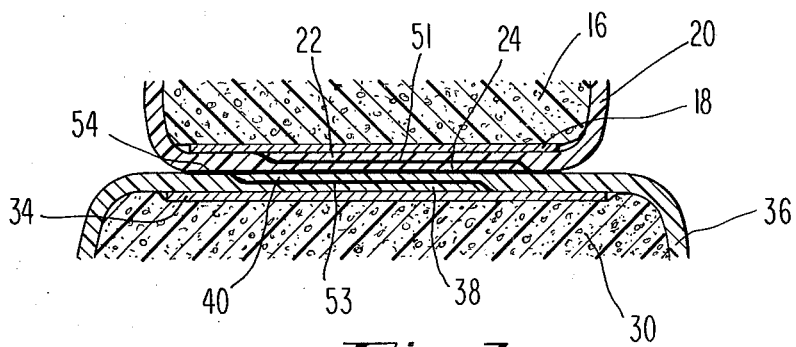
FIG. 3 is a fragmentary sectional view of the handle after the sealing operation and showing the sealing junction.

One longitudinal end portion 22 of the sheath abuts the conductive member 18 while the other longitudinal end portion 24 overlaps the first end portion 22 as seen clearly in FIG. 2.

The lower portion 14 of the handgrip includes a core comprised of a flat spring bar 26, generally about 1/64 inch to 1/32 inch thick, between a pair of thin strips 28, generally about 0.015 inch thick, a pair of upper and lower cushioning members 30 and 32 generally about 1/16 inch to 3/8 inch thick on both sides of the strips 28, and an elongated conductive member 34 above the upper cushioning member 30.

The spring bar 26 may be made of any suitable spring metal, preferably steel. The thin strips 28 are merely used to keep the cushioning members 30 and 32 in place if they are open-cell material but the strips 28 may be dispensed with. The cushioning members 30 and 32 are made of the same foam materials used for the cushioning member 16, and the conductive member 34 is made of the same materials used for the conductive member 18. One can exclude the spring bar 26 and still provide a flexible handle. If a stiff handle is desired, a rigid member can be included in the core.

A thermoplastic sheath 36, also generally about 1/32 inch thick, surrounds the core of the lower handgrip portion 14. It may be made of the same or different thermoplastic resins as those used to make upper sheath 20 and may be colored the same as or different from that of sheath 20 to obtain various esthetic effects.

One longitudinal end portion 38 of the sheath 36 abuts the conductive member 34 while the other longitudinal end portion 40 of the sheath 36 overlaps the end portion 38, as seen clearly in FIG. 2.

The method of making the present handgrip employs a conventional dielectric sealing apparatus having a fixed bed 42 connected to ground including a die cavity 44 therein, a vertically movable punch 46 attached to a positive electrode bar substantially coextensive with the handgrip 10 and a very high frequency alternating current connected therebetween. See, for example, "Heat Sealing" by Robert D. Farkas, Reinhold Publishing Corporation, New York, 1964, Chapters 7 and 8, which is herein incorporated by reference.

The upper handgrip portion 12 is placed on the lower portion 14 in such a manner that the outer overlapping longitudinal end portion 24 of the upper sheath 20 abuts and contacts the full length of the outer overlapping longitudinal end portion 40 of the lower sheath 36. So assembled, the unit is placed in the cavity 44. The punch 46 is then lowered against the assembled unit.

It should be noted that the free lateral ends of the handgrip are open so that the steel bar 26 extends outwardly of said ends (not shown) as do the upper and lower conductive members 18 and 34. Both extending ends of the upper conductive member 18 are electrically and removably connected as at 48 to the electrode bar 50 from which the punch depends. Similarly, both extending ends of the lower conductive member 34 are electrically and removably connected as at 52 to the upper surface of the ground bed 42. These connections can be effected in several ways, as by adhesion where the conductive members are adhesive backed metal foils or strips, by simply laying weighted metal bars over the free ends of the conductive members (not shown) to cause the conductive members to make the necessary electrical contact, or by providing the punch electrode bar 50 and bed electrode 42 with metallic spring clips to removably receive the free ends of the conductive members 18 and 34.

Thereafter, the current is applied for 4-6 seconds at a 2 KW output, whereupon the upper overlapped longitudinal ends 22, 24 thin out and become sealed to each other as at 51, the lower overlapped longitudinal ends 38, 40 also thin out and become sealed to each other as at 53 and the thinned out abutting upper and lower longitudinal ends 24 and 40 become sealed to each other. The thinning occurs because the thermoplastic sheaths are themselves somewhat porous so that when the overlapped ends meet, the material of said ends melts and enters into each other's pores. Also, because of this thinning, the action of the punch 46 in pressing the upper unit 12 against the lower unit 14 and the fact that the current is carried by the electrodes 18 and 34 (which is the area of sealing), further sealing takes place between the upper and lower sheaths along a line equal to the width of the upper narrower electrode 18 to provide a seal line 54 as shown clearly in FIG. 3. Thus, the upper and lower units 12 and 14 are firmly connected to form a strong attractive unitary handgrip unit with concealed lapped sealed sheath ends. The handle is then finished by securing suitable hardware 56 to the ends of the handgrip as seen in FIG. 7.

Coming now to FIGS. 4, 5 and 6, it has been found that a strong unitary handgrip with concealed lapped sealed sheath ends can be produced using disparate sheaths, that is, one thermoplastic and the other porous non-thermoplastic.

Thus, the upper discrete member 58 comprises a core including a cushioning member 60 and a conductive member 62 beneath the cushioning member. A porous non-thermoplastic sheath 64, preferably cotton, wool or polyester cloth, surrounds the core and includes an inner longitudinal end portion 66 which abuts the conductive member 62 and an outer longitudinal end portion 68 which overlaps the inner end portion 66.

The lower discrete member 70 includes a core comprised of a spring steel bar 72 between two thin retainer members 74, cushioning members 76 on both sides of the thin retainer members, and a conductive member 78 above the upper cushioning member 76. As in the handgrip of FIGS. 1-3 and 6, the thin retainer members can be excluded as can the spring steel bar which can be replaced with a stiffener member. A thermoplastic, i.e. dielectrically sealable sheath 80 surrounds the core 72, 74, 76 and 78, the sheath having an outer longitudinal end portion 82 which abuts and contacts the full length of the outer longitudinal end portion 68 of the upper member 58, and an inner longitudinal end portion 84 which overlaps the end portion 82 and abuts conductive member 78.

As assembled in FIG. 4, the unit is placed in the cavity 44 of the electrode bed 42, the punch 46 is lowered against the unit, the extending ends of the upper and lower conductive members 62 and 78 are removably and electrically connected to the bar 50 of the punch electrode and to the bed electrode 42 respectively, and the current applied as previously described. The result is that the overlapped ends 82 and 84 of the thermoplastic sheath 80 not only melt, enter each other's pores, thin out and seal to each other, but the molten thermoplastic material also enters the pores and the fibers of the overlapped ends 66 and 68 of the fabric non-thermoplastic sheath 64 as at 86, see FIG. 6, to form a strong tight bond between the upper and lower handgrip members 58 and 70. As with the handgrip of FIGS. 1-3 and 7, the seal between the two units 58 and 70 extends for the full width of the narrower electrode, in this case the upper conductive member 62, it being understood that both conductive members 62 and 78 may be of equal width or the member 78 may be narrower than member 62, if desired.

Coming now to FIG. 8, either discrete member, upper or lower, can have a sheath with overlapping ends while the other's sheath does not contain overlapped ends. Thus, the upper member 90 surrounding the core 92 includes end portions 94 and 96 which are spaced from each other as at 98 or they may abut edge to edge and underlie the electrode 100 in the core. The lower member 102 includes a core 104 with an electrode 106 therein and a sheath 108 surrounding the core, the sheath including an inner end portion 110 adjacent the electrode 106 and an outer end portion 112 which overlaps the inner end portion 110 and abuts the spaced end portions 94 and 96 of the upper member 90. The reason one of the sheaths has overlapped ends is to prevent short circuiting between the electrodes 100 and 106. When the handgrip of FIG. 8 is dielectrically sealed in the apparatus of FIG. 1 and in the manner previously described, the abutting sheath ends melt and seal for the width of the narrower electrode 100.

While preferred embodiments have here been shown and described, it will be understood that variations may be made by skilled artisans without departing from the spirit of the invention.

What is claimed is:

1. A handgrip for a handle comprised of two discrete elongated members each including a cushioning core of flexibly resilient material surrounded by a sheath, the sheath of each member including overlapped longitudinal ends, the overlapped longitudinal ends of one sheath abutting the overlapped longitudinal ends of the other sheath, the overlapped longitudinal ends of each sheath being sealed to each other and the overlapped longitudinal ends of said one sheath being sealed to the abutting overlapped longitudinal ends of said other sheath to form a unitary handgrip with concealed lapped longitudinal ends and wherein the sheath of one discrete elongated member is thermoplastic.

2. The handgrip of claim 1 and a flexible electrically conductive member in each cushioning core adjacent the overlapped longitudinal ends of the sheath.

3. The handgrip of claim 1 and a stiffening member extending through the cushioning core of one of said discrete elongated members.

4. The handgrip of claim 3 wherein said stiffening member is a spring steel bar.

5. The handgrip of claim 1 wherein the sheaths of the discrete elongated members are thermoplastic.

6. The handgrip of claim 1 wherein the sheath of the other discrete elongated member is porous and non-thermoplastic.

7. The handgrip of claim 2 in which the length of the seal between the two discrete members is substantially of the same width as that of at least one of said flexible conductive members.

8. A handgrip for a handle comprised of a first elongated discrete member including a first cushioning core and a first sheath coextensive with and surrounding said first core and including a first set of overlapped longitudinal end portions, a second elongated discrete member including a second cushioning core, and a second sheath coextensive with and surrounding said second core and including a second set of overlapped longitudinal end portions, said first and second sets of overlapped end portions abutting, the overlapped end portions of said first set being sealed to each other, the overlapped end portions of said second set being sealed to each other and the abutting longitudinal overlapped end portions of said first and second sheaths also being sealed to provide a unitary handgrip with concealed sealed overlapped end portions and wherein the sheath of one discrete elongated member is thermoplastic.

9. The handgrip of claim 8 wherein the first and second sheaths are thermoplastic.

10. The handgrip of claim 8 wherein the first sheath is thermoplastic and the second sheath is porous and non-thermoplastic.

11. The handgrip of claim 10 wherein the non-thermoplastic porous second sheath is cloth.

12. The handgrip of claim 8 wherein at least one core includes a cushioning member of flexibly resilient material.

13. The handgrip of claim 12 wherein both cores include cushioning members and flexible electrically conductive members.

14. A handgrip for a handle comprised of a first elongated discrete member including a first cushioning core of flexibly resilient material and a first sheath coextensive with and surrounding said first core and including overlapped longitudinal end portions, a second elongated discrete member including a second cushioning core of flexibly resilient material, and a second sheath coextensive with and surrounding said second core and including non-overlapped longitudinal end portions, said overlapped end portions of said first sheath abutting said non-overlapped end portions of said second sheath, said overlapped end portions of said first sheath being sealed to each other and to the non-overlapped end portions of said second sheath to provide a unitary handgrip with concealed overlapped end portions and wherein the sheath of one discrete elongated member is thermoplastic.

15. The handgrip of claim 14 wherein said cores include flexible electrically conductive members each adjacent the longitudinal ends of each sheath.

* * * * *